United States Patent
Yang et al.

(10) Patent No.: US 10,051,464 B2
(45) Date of Patent: Aug. 14, 2018

(54) APPARATUS AND METHODS FOR ELECTRONIC SUBSCRIBER IDENTITY MODULE (ESIM) INSTALLATION AND INTEROPERABILITY

(71) Applicant: Apple Inc., Cupertino, CA (US)

(72) Inventors: Xiangying Yang, Cupertino, CA (US); Li Li, Los Altos, CA (US); Arun G. Mathias, Sunnyvale, CA (US)

(73) Assignee: Apple Inc., Cupertino, CA (US)

( * ) Notice: Subject to any disclaimer, the term of this patent is extended or adjusted under 35 U.S.C. 154(b) by 182 days.

(21) Appl. No.: 15/093,595

(22) Filed: Apr. 7, 2016

(65) Prior Publication Data

US 2016/0302070 A1    Oct. 13, 2016

Related U.S. Application Data

(60) Provisional application No. 62/146,164, filed on Apr. 10, 2015.

(51) Int. Cl.
*H04L 29/06* (2006.01)
*H04W 12/02* (2009.01)
*H04W 4/50* (2018.01)

(52) U.S. Cl.
CPC ............. *H04W 12/02* (2013.01); *H04W 4/50* (2018.02)

(58) Field of Classification Search
CPC ..................................................... H04W 12/02
See application file for complete search history.

(56) References Cited

U.S. PATENT DOCUMENTS 8,977,658 B2  3/2015 Meng et al.
9,510,186 B2  11/2016 Li et al.
(Continued)

FOREIGN PATENT DOCUMENTS

WO    2014193181 A1    12/2014

OTHER PUBLICATIONS

"ITU-T X.690. Series X: Data Networks and Open System Communications. OSI networking and system aspects—Abstract Syntax Notation One (ASN.1)", Jul. 2002.*
(Continued)

*Primary Examiner* — Shawnchoy Rahman
(74) *Attorney, Agent, or Firm* — Dickinson Wright RLLP

(57) ABSTRACT

Methods and apparatus for managing processing of electronic Subscriber Identity Modules (eSIM) data at a mobile device are disclosed. An eSIM management entity of an embedded Universal Integrated Circuit Card (eUICC) in the mobile device obtains an encrypted eSIM package, decrypts the eSIM package to obtain eSIM contents formatted generically and not specifically tailored to requirements of the eUICC. In some embodiments, the eSIM contents are formatted based on an abstract syntax notation (ASN) distinguished encoding rules (DER) format. The eSIM management entity parses the formatted eSIM contents to retrieve individual eSIM components and installs each eSIM component for the eSIM in an eSIM security domain on the eUICC. In some embodiments, the eSIM management entity acts as a local, personalization server to provide local Trusted Service Manager (TSM) server functionality for eSIM installation that transforms "generically formatted" eSIM contents into eSIM components that match specific requirements of the eUICC.

20 Claims, 6 Drawing Sheets

(56) References Cited

U.S. PATENT DOCUMENTS

| | | | |
|---|---|---|---|
| 9,730,072 B2 * | 8/2017 | Yang | H04W 12/08 |
| 9,736,678 B2 | 8/2017 | Li et al. | |
| 2011/0258446 A1 | 10/2011 | Brown et al. | |
| 2013/0303122 A1 * | 11/2013 | Li | H04W 8/20 |
| | | | 455/411 |
| 2014/0140509 A1 * | 5/2014 | Chastain | G06F 21/6227 |
| | | | 380/270 |
| 2014/0349617 A1 | 11/2014 | Li et al. | |
| 2016/0021529 A1 * | 1/2016 | Park | H04W 8/205 |
| | | | 455/410 |
| 2016/0127132 A1 | 5/2016 | Lee et al. | |
| 2017/0171742 A1 | 6/2017 | Yang et al. | |

OTHER PUBLICATIONS

PCT Patent Application No. PCT/US2016/026513—International Search Report and Written Opinion dated Aug. 30, 2016.
Technical Specification: ETSI TS 103 383 v 12.7.0 (Feb. 2015). Smart Cards; Embedded UICC; Requirements Specification (Release 12).

* cited by examiner

APPARATUS AND METHODS FOR ELECTRONIC SUBSCRIBER IDENTITY MODULE (ESIM) INSTALLATION AND INTEROPERABILITY

CROSS-REFERENCE TO RELATED APPLICATIONS

This Application claims the benefit of U.S. Provisional Application No. 62/146,164, entitled "APPARATUS AND METHODS FOR ELECTRONIC SUBSCRIBER IDENTITY MODULE (ESIM) INSTALLATION AND INTEROPERABILITY", filed Apr. 10, 2015, the content of which is incorporated by reference herein in its entirety for all purposes.

FIELD

The described embodiments set forth techniques for processing electronic Subscriber Identity Modules (eSIMs) and installing the eSIMs on embedded Universal Integrated Circuit Cards (eUICCs) included in mobile devices.

BACKGROUND

Many mobile devices are configured to use removable Universal Integrated Circuit Cards (UICCs) that enable the mobile devices to access services provided by Mobile Network Operators (MNOs). In particular, each UICC includes at least a microprocessor and a read-only memory (ROM), where the ROM is configured to store an MNO profile that the mobile device can utilize to register and interact with an MNO. Typically, a UICC takes the form of a small removable card (commonly referred to as a Subscriber Identity Module (SIM) card) that is configured to be inserted into a UICC-receiving bay included in a mobile device. In more recent implementations, however, UICCs are being embedded directly into system boards of mobile devices. These embedded UICCs (eUICCs) can provide several advantages over traditional, removable UICCs. For example, some eUICCs include a rewritable memory that can facilitate installation, modification, and/or deletion of one or more eSIMs, which can provide for new and/or different services and/or updates for accessing extended features provided by MNOs. An eUICC can store a number of MNO profiles— also referred to herein as eSIMs—and can eliminate the need to include UICC-receiving bays in mobile devices. Moreover, eSIMs can be remotely provisioned to mobile devices, which can substantially increase flexibility when users travel to different countries, migrate their phone numbers to different MNOs, and the like.

Presently, a common approach for managing eSIMs of mobile devices is MNO-centric, and involves network equipment of an MNO, such as a provisioning server, communicating with an eUICC of a mobile device through an over-the-air (OTA) secure channel. With the OTA secure channel established between the provisioning server and the eUICC of the mobile device, the provisioning server can remotely manage an appropriate eSIM of the eUICC included in the mobile device by sending commands to the eUICC over the OTA secure channel.

Notably, the foregoing MNO-centric provisioning technique can have a number of drawbacks. One drawback, for example, is that different MNOs, different servers of MNOs, and/or different eUICCs may use different sets of proprietary protocols with which to communicate and manage eSIMs. A format for communicating eSIM information and/or a particular sequence of commands by which a server interacts with an eUICC to communicate and manage eSIMs may vary substantially, which impedes interoperability in eSIM management by multiple MNOs and/or multiple provisioning servers across different eUICCs in different mobile devices.

SUMMARY

Representative embodiments set forth techniques for managing the processing of electronic Subscriber Identity Module (eSIM) data at a mobile device. According to some embodiments, an eSIM management entity of an embedded Universal Integrated Circuit Card (eUICC) included in the mobile device obtains an encrypted eSIM package. The eSIM management entity on the eUICC can be an application that includes specific security service capabilities, such as for secure communication and encryption/decryption. The eSIM management entity on the eUICC decrypts the encrypted eSIM package to obtain contents of an eSIM. The contents of the eSIM obtained from the decryption of the encrypted eSIM package can be formatted generically, rather than being specifically tailored to requirements of a particular eUICC or mobile device, or for manufacturers thereof. In some embodiments, the contents of the eSIM package can be formatted in accordance with a standardized communications protocol or specification, or in accordance with an accepted communications industry de facto standard format. The contents of the eSIM package can be formatted such that the same format applies to eSIMs for different provisioning servers, MNOs, eUICCs, mobile devices, eUICC suppliers, and/or mobile device manufacturers. The contents of the eSIM can be formatted in accordance with an abstract syntax notation (ASN), e.g., ASN.1, distinguished encoding rules (DER) format. The eSIM management entity parses the formatted contents of the eSIM to retrieve individual eSIM (profile) components. The eSIM package can also provide context information for handling the eSIM components. In some embodiments, the eSIM management entity personalizes the parsed eSIM contents for installation on the eUICC. The eSIM management entity installs each eSIM (profile) component for the eSIM in an eSIM security domain. In some embodiments, the eSIM management entity acts as a local, personalization server to provide local Trusted Service Manager (TSM) server functionality for eSIM installation that transforms "generically formatted" contents of an eSIM into a set of individual eSIM components having a specific format that matches requirements of the eUICC, the mobile device, and/or a manufacturer thereof. Representative requirements of the eUICC can include hardware requirements, software requirements, operating system (OS) requirements, or combinations of these that can determine, at least in part, a format for an eSIM stored on the eUICC (or for one or more eSIM components) and/or for management of eSIMs stored on the eUICC.

This Summary is provided merely for purposes of summarizing some example embodiments so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

Other aspects and advantages of the embodiments described herein will become apparent from the following detailed description taken in conjunction with the accompanying drawings which illustrate, by way of example, the principles of the described embodiments.

BRIEF DESCRIPTION OF THE DRAWINGS

The included drawings are for illustrative purposes and serve only to provide examples of possible structures and arrangements for the disclosed inventive apparatuses and methods for providing wireless computing devices. These drawings in no way limit any changes in form and detail that may be made to the embodiments by one skilled in the art without departing from the spirit and scope of the embodiments. The embodiments will be readily understood by the following detailed description in conjunction with the accompanying drawings, wherein like reference numerals designate like structural elements.

DETAILED DESCRIPTION

Figure 1:
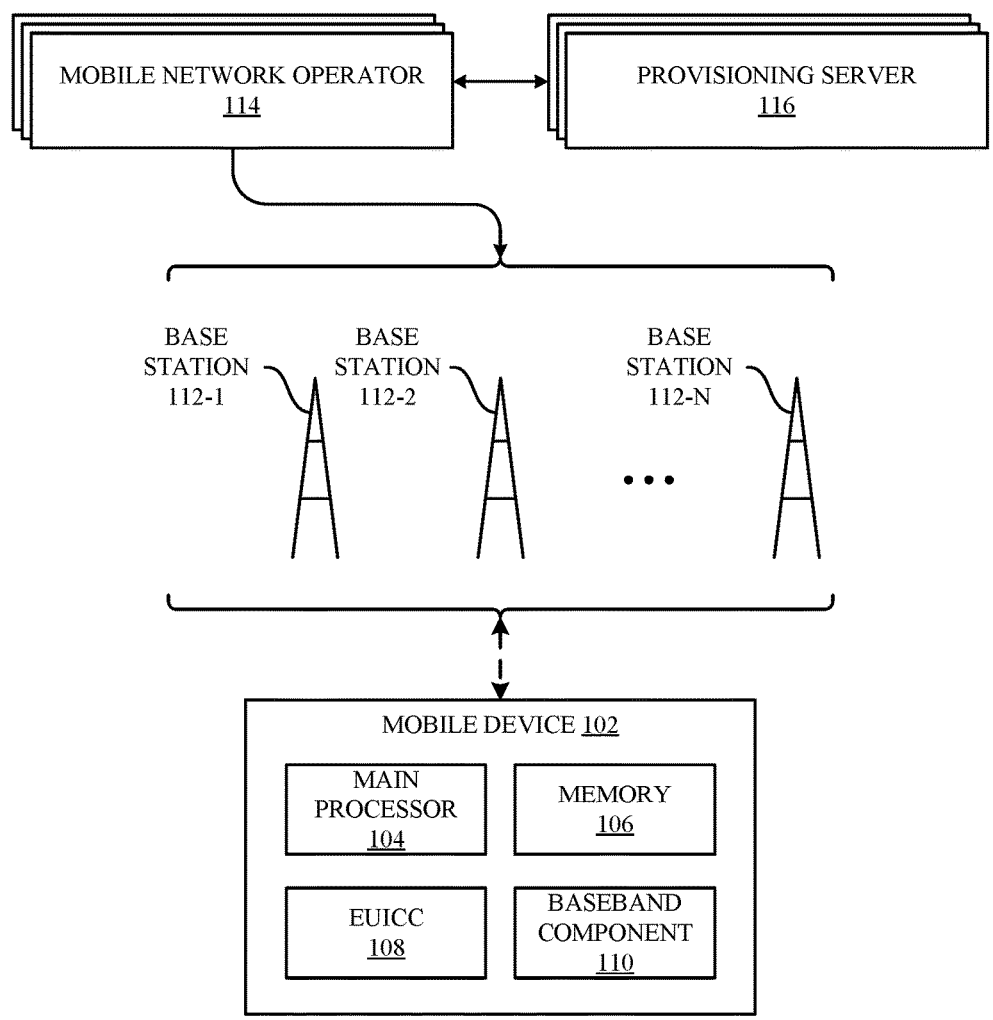
FIG. 1 illustrates a block diagram of different components of a system configured to implement the various techniques described herein, according to some embodiments.

Representative applications of apparatuses and methods according to the presently described embodiments are provided in this section. These examples are being provided solely to add context and aid in the understanding of the described embodiments. It will thus be apparent to one skilled in the art that the presently described embodiments can be practiced without some or all of these specific details. In other instances, well known process steps have not been described in detail in order to avoid unnecessarily obscuring the presently described embodiments. Other applications are possible, such that the following examples should not be taken as limiting.

In accordance with various embodiments described herein, the terms "wireless communication device," "wireless device," "mobile device," "mobile station," and "user equipment" (UE) may be used interchangeably herein to describe one or more common consumer electronic devices that may be capable of performing procedures associated with various embodiments of the disclosure. In accordance with various implementations, any one of these consumer electronic devices may relate to: a cellular phone or a smart phone, a tablet computer, a laptop computer, a notebook computer, a personal computer, a netbook computer, a media player device, an electronic book device, a MiFi® device, a wearable computing device, as well as any other type of electronic computing device having wireless communication capability that can include communication via one or more wireless communication protocols such as used for communication on: a wireless wide area network (WWAN), a wireless metro area network (WMAN) a wireless local area network (WLAN), a wireless personal area network (WPAN), a near field communication (NFC), a cellular wireless network, a fourth generation (4G) Long Term Evolution (LTE), LTE Advanced (LTE-A), and/or 5G or other present or future developed advanced cellular wireless networks.

The wireless communication device, in some embodiments, can also operate as part of a wireless communication system, which can include a set of client devices, which can also be referred to as stations, client wireless devices, or client wireless communication devices, interconnected to an access point (AP), e.g., as part of a WLAN, and/or to each other, e.g., as part of a WPAN and/or an "ad hoc" wireless network. In some embodiments, the client device can be any wireless communication device that is capable of communicating via a WLAN technology, e.g., in accordance with a wireless local area network communication protocol. In some embodiments, the WLAN technology can include a Wi-Fi (or more generically a WLAN) wireless communication subsystem or radio, the Wi-Fi radio can implement an Institute of Electrical and Electronics Engineers (IEEE) 802.11 technology, such as one or more of: IEEE 802.11a; IEEE 802.11b; IEEE 802.11g; IEEE 802.11-2007; IEEE 802.11n; IEEE 802.11-2012; IEEE 802.11ac; or other present or future developed IEEE 802.11 technologies.

Additionally, it should be understood that the UEs described herein may be configured as multi-mode wireless communication devices that are also capable of communicating via different third generation (3G) and/or second generation (2G) RATs. In these scenarios, a multi-mode UE can be configured to prefer attachment to LTE networks offering faster data rate throughput, as compared to other 3G legacy networks offering lower data rate throughputs. For instance, in some implementations, a multi-mode UE may be configured to fall back to a 3G legacy network, e.g., an Evolved High Speed Packet Access (HSPA+) network or a Code Division Multiple Access (CDMA) 2000 Evolution-Data Only (EV-DO) network, when LTE and LTE-A networks are otherwise unavailable.

Representative embodiments described herein set forth techniques for managing the processing of electronic Subscriber Identity Module (eSIM) data at a mobile device. Forthcoming communication standards protocols, such as specified in the European Technical Standards Institute (ETSI) Technical Specification (TS) 103.383, require eSIM interoperability across different eUICCs. In particular, an eUICC should support the loading and installing of eSIMs (profiles) that may be generated by different profile provisioning credential holders. An eSIM can use a standardized description format that permits loading and installation on any eUICC that complies with eSIM interoperability, e.g., as specified in ETSI TS 103.383 and/or other applicable communications standards protocols and/or de facto communications industry standard format. The standardized description format used for the eSIM can include a number of different standardized items, such as network access application (NAA) parameters, NAA algorithm parameters and keys, "over-the-air" (OTA) keys, remote applet management (RAM) and remote file management (RFM) parameters, personal identification numbers (PINs), and personal unlock keys (PUKs). Further, an interface, in terms of a file structure and associated metadata, for an eSIM to be remotely provisioned to an eUICC should conform to a common specified type. In some embodiments, a format for contents of an eSIM can be based on abstract syntax notation (ASN.1) distinguished encoding rules (DER). To achieve eSIM interoperability, the structure for an eUICC's architecture and/or operating system (OS) may be required to be modified to accommodate new "standardized" or "generic" eSIM formats and/or eSIM processing to manage the parsing of formatted contents of an eSIM obtained from a "standardized" eSIM package into a set of individual eSIM components in a format compatible with and/or specific to the eUICC.

According to some embodiments, an eSIM management entity of an embedded Universal Integrated Circuit Card (eUICC) included in the mobile device obtains an encrypted eSIM package having formatted contents. The contents of the eSIM package can be formatted in accordance with a communications standards protocol or specification or based on a de facto communications industry standard format. The eSIM management entity on the eUICC can be (1) an Issuer Security Domain (ISD) level application, (2) a security domain in accordance with a GlobalPlatform® specification, (3) a security domain associated with one or more profiles or eSIMs in communication with eUICC operating system (OS) installation services, and/or (4) a specialized application with specific security service capabilities, such as for secure communication and encryption/decryption. The eSIM management entity on the eUICC decrypts the encrypted eSIM package to obtain contents of an eSIM, where the contents are formatted in a "generic" or "standard" format that applies across different eUICCs and/or mobile devices. The same format for contents of an eSIM can be used for different eUICCs and/or mobile devices (and manufacturers thereof). Similarly different provisioning servers for different MNOs can provide eSIM packages with contents that are similarly formatted accordingly. In some embodiments, the contents of the eSIM can be formatted in accordance with a communications standards protocol or specification or a communications industry de facto standard format. In some embodiments, the contents of the eSIM are formatted in accordance with an abstract syntax notation (ASN), e.g., ASN.1, distinguished encoding rules (DER) format. The eSIM management entity parses the formatted contents of the eSIM to retrieve individual eSIM (profile) components, which can include files, e.g., elementary files (EFs) and dedicated files (DFs), applications, security domain settings, eSIM encryption/decryption keys, network access application (NAA) parameters, NAA algorithm parameters and keys, over-the-air (OTA) keys, remote applet management (RAM) and remote file management (RFM) parameters, personal identification numbers (PINs), and/or personal unlock keys (PUKs). The eSIM package can also provide context information for handling components of the eSIM, e.g., implicit file path information by which to organize one or more EFs under a common DF path, and/or an implicit record fill pattern, such as 'FF' with which to pad the contents of individual components of the eSIM to an appropriate size after parsing, such as when the contents of the eSIM are compressed to reduce a size of the eSIM package for communication between the provisioning server and the eUICC of the mobile device. In some embodiments, the eSIM management entity on the eUICC personalizes the parsed contents of the eSIM for installation on the eUICC, such as the use of keys and/or secrets by the eUICC during installation of the contents of the eSIM on the eUICC. The eSIM management entity installs each individual components of the eSIM (profile) in an eSIM security domain. In some embodiments, the eSIM management entity acts as a local, personalization server to provide local TSM server functionality for eSIM installation that transforms a generic or "standards formatted" eSIM package into a specific format that matches requirements of the eUICC. In some embodiments, the requirements of the eUICC include a format for an eSIM, such as an individual eSIM component and/or an organization of eSIM components stored on the eUICC. In some embodiments, the requirements of the eUICC include hardware requirements and/or software (such as for an eUICC operating system) requirements that influence a format for the eSIM stored on the eUICC, an organization of eSIM components on the eUICC, and/or a series of commands used to install, add, modify, update, and/or perform other eSIM management operations for the eSIM on the eUICC. In some embodiments, the eSIM management entity parses different eSIM packages, each formatted in accordance with a standard protocol, into different eSIM contents and installs the different eSIM contents in different security domains in accordance with hardware, software, and/or OS requirements for the eSIM and/or for an MNO with which the eSIM is associated. In some embodiments, the post-installation data structure for the eSIM contents stored in an associated security domain of the eUICC is formatted in a manner specific to the eUICC OS used by the eUICC. In some embodiments, eSIM management entities external to the eUICC, such as a terminal interface or a remote management server, can interface with the "personalized" eSIM on the eUICC in accordance with one or more standardized communication protocols.

Accordingly, the eSIM management techniques described herein provide an approach for managing eSIMs in an interoperable manner, in comparison to conventional, MNO-specific, server-specific, and/or eUICC-specific eSIM management techniques, as the eUICC can receive standardized and/or generically formatted eSIM packages and transform contents of the eSIM packages into a format that is specifically compatible with one or more requirements of the eUICC for management and/or storage of the eSIM on the eUICC. A more detailed discussion of these techniques is set forth below and described in conjunction with FIGS. 1-5, which illustrate detailed diagrams of systems and methods that can be used to implement these techniques.

FIG. 1 illustrates a block diagram of different components of a system 100 that is configured to implement the various techniques described herein, according to some embodiments. More specifically, FIG. 1 illustrates a high-level overview of the system 100, which, as shown, includes a mobile device 102, a group of base stations 112 that are managed by different MNOs 114, and a set of provisioning servers 116 that are in communication with the MNOs 114. According to the illustration of FIG. 1, the mobile device 102 can represent a mobile computing device (e.g., an iPhone® or an iPad® by Apple®), the base stations 112 can represent different radio towers that are configured to communicate with the mobile device 102, and the MNOs 114 can represent different wireless service providers that provide specific services (e.g., voice and data) to which the mobile device 102 can be subscribed.

As shown in FIG. 1, the mobile device 102 can include a main processor 104, a memory 106, an eUICC 108, and a baseband component 110. These components work in conjunction to enable the mobile device 102 to provide useful features to a user of the mobile device 102, such as localized computing, location based services, and Internet connectivity. As described in greater detail below, the eUICC 108 can be configured to store multiple eSIMs for accessing the different MNOs 114 through the base stations 112. For example, the eUICC 108 can be configured to store and manage one or more eSIMs for one or more MNOs 114 for different subscriptions to which the mobile device 102 is associated. To be able to access services provided by the MNOs, an eSIM is provisioned to the eUICC 108. In addition, eSIMs stored on the eUICC 108 can be updated, modified, activated, deactivated, and/or deleted via communication between the eUICC 108 of the mobile device 102 and applicable network equipment, such as the provisioning servers 116 (or other equivalent or similar network-based eSIM management entities). In some embodiments, eSIMs are pre-stored in the eUICC 108 in an inactive state, and during a provisioning process, the eUICC 108 obtains MNO credentials (e.g., keys, etc.), service information (e.g., carrier information, services subscribed to), and/or other information, and uses this information to activate the eSIM. In some embodiments, eSIMs are not pre-stored in the eUICC 108, and the eUICC 108 obtains one or more eSIMs from one or more associated provisioning servers 116. It is noted that provisioning servers 116 can be maintained by a manufacturer of the mobile device 102, the MNOs 114, third party entities, and the like. Communication of eSIM data between a provisioning server 116 and the eUICC 108 uses a secure communication channel, over which a series of commands between the provisioning server 116 and the eUICC 108 results in provisioning (or other management) of an eSIM to (or on) the eUICC 108. As different eUICC 108 (or UICC) manufacturers (or mobile device manufacturers) presently can require different "proprietary" protocols for formatting eSIM data and/or for managing eSIMs on an eUICC 108, such as requiring a specific series of commands, different eSIMs from different MNOs and/or different provisioning servers 116 provided to the same eUICC 108 can require different handling, which can impede eSIM interoperability. As described further herein, a provisioning server 116 can provide a "standardized" or "generically" formatted eSIM package to an eUICC 108 of a mobile device 102, and an eSIM management entity on the eUICC 108 can extract a set of eSIM components from the eSIM package to install, modify, update, or otherwise manage an eSIM on the eUICC. Although not illustrated in FIG. 1, the mobile device 102 can also be configured to include a receiving bay for a removable UICC (e.g., a SIM card), on which an eSIM can be managed in a similar manner using the techniques described herein.

Figure 2:
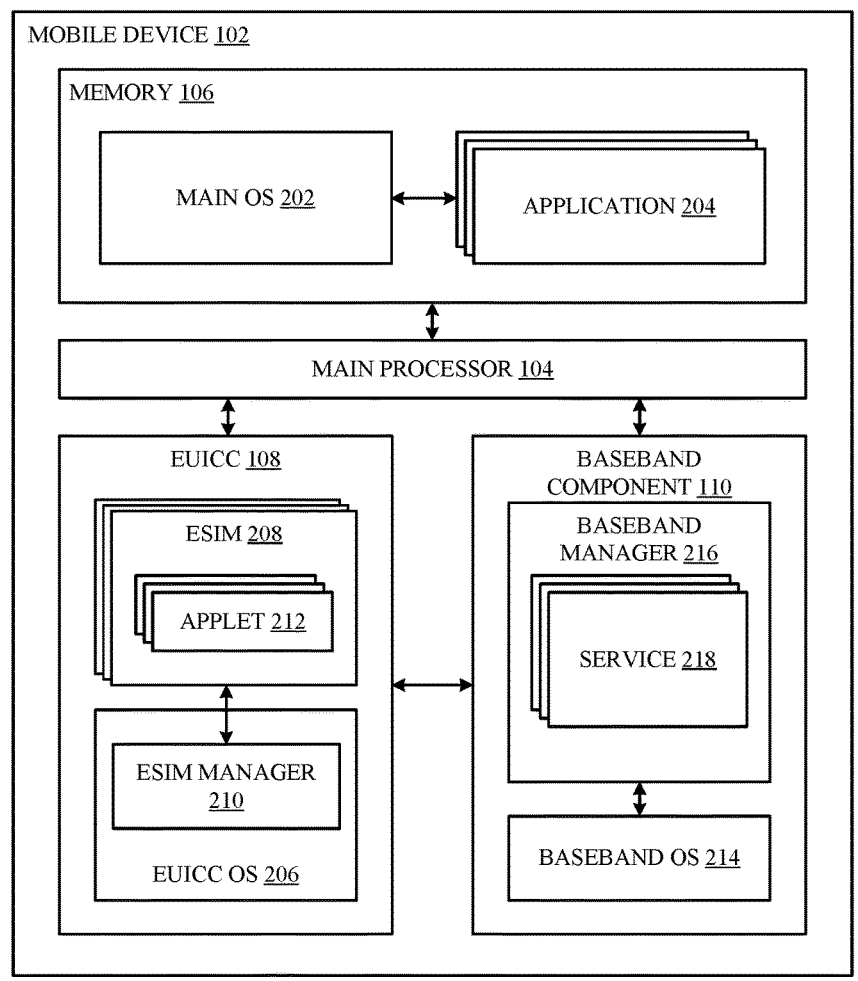
FIG. 2 illustrates a block diagram of a more detailed view of particular components of the system of FIG. 1, according to some embodiments.

FIG. 2 illustrates a block diagram of a more detailed view 200 of particular components of the mobile device 102 of FIG. 1, according to some embodiments. As shown in FIG. 2, the main processor 104, in conjunction with the memory 106, can implement a main operating system (OS) 202 that is configured to execute applications 204 (e.g., native OS applications and user applications). As also shown in FIG. 2, the eUICC 108 can be configured to implement an eUICC OS 206 that is configured to manage the hardware resources of the eUICC 108 (e.g., a processor and a memory embedded in the eUICC 108). The eUICC OS 206 can also be configured to manage eSIMs 208 that are stored by the eUICC 108, e.g., by activating, deactivating, modifying, or otherwise performing management of the eSIMs 208 within the eUICC 108 and providing the baseband component 110 with access to the eSIMs 208 to provide access to wireless services for the mobile device 102. The eUICC 108 OS can include an eSIM manager 210, which can be an Issuer Security Domain (ISD) level application, a "security domain" in accordance with a GlobalPlatform specification, a security domain associated with one or more eSIMs and that calls additional eUICC OS installation services, and/or an application that implements a specific set of security services, e.g., for establishing and managing a secure channel and/or to provide encryption/decryption functions. The eSIM manager 210 can perform management functions for various eSIMs as described further herein. According to the illustration shown in FIG. 2, each eSIM 208 can include a number of applets 212 that define the manner in which the eSIM 208 operates. For example, one or more of the applets 212, when implemented by the baseband component 110 and the eUICC 108, can be configured to enable the mobile device 102 to communicate with an MNO 114 and provide useful features (e.g., phone calls and internet) to a user of the mobile device 102.

As also shown in FIG. 2, the baseband component 110 of the mobile device 102 can include a baseband OS 214 that is configured to manage hardware resources of the baseband component 110 (e.g., a processor, a memory, different radio components, etc.). According to some embodiments, the baseband component 110 can implement a manager 216 that is configured to interface with the eUICC 108 to implement various techniques described herein, which can include establishing a secure channel with a provisioning server 116 and obtaining information (such as eSIM data) from the provisioning server 116 for purposes of managing eSIMs 208, including but not limited to provisioning, loading, installing, adding, modifying, updating, deleting, or performing other management operations for one or more eSIMs 208. As also shown in FIG. 2, the manager 216 can be configured to implement services 218, which represents a collection of software modules that are instantiated by way of the various applets 212 of activated eSIMs 208 that are included in the eUICC 108. For example, services 218 can be configured to manage different connections between the mobile device 102 and MNOs 114 according to the different eSIMs 208 that are activated within the eUICC 108.

Figure 3A:
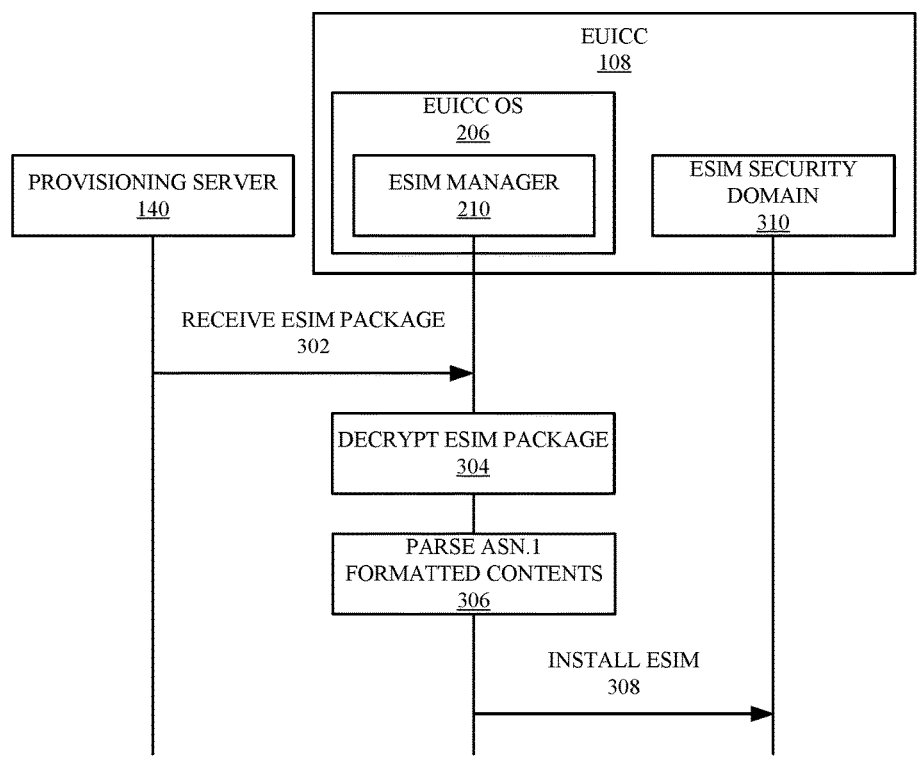
FIG. 3A illustrates a sequence diagram of a method for installing an eSIM for storage on an eUICC of the mobile device of FIG. 1, according to some embodiments.

FIG. 3A illustrates a sequence diagram 300 for a set of steps by which the eUICC 108 of the mobile device 102 can obtain and process a standardized, formatted eSIM package from the provisioning server 140. In step 302, the eSIM manager 210 of the eUICC 108 can receive an eSIM package from the provisioning server 140. In some embodiments, the provisioning server 140 "pushes" the eSIM package to the eUICC 108, e.g., to install an update to an existing eSIM 208 of the eUICC 108 or to provision an eSIM 208 to the eUICC 108 in response to a request from the mobile device 102 (or via another path not shown). In some embodiments, the eSIM package (and/or contents of an eSIM 208 included therein) is formatted in accordance with a standards-based communications protocol or specification, e.g., a specification of 3GPP, ETSI, IEEE, or other wireless standards organization. In some embodiments, the eSIM package and/or its contents are formatted in accordance with a communications industry de facto standard format. In some embodiments, the eSIM package (and/or the eSIM contents included therein) is formatted in accordance with an ASN.1 DER coded format. In some embodiments, the eSIM package received by the eSIM manager 210 from the provisioning server 140 is encrypted, e.g., to provide a level of security protection for the eSIM package. In step 304, the eSIM manager 210 decrypts the encrypted, formatted eSIM package to retrieve eSIM contents, which can be ASN.1 DER coded eSIM contents in some embodiments. The contents of the eSIM 208 obtained from the eSIM package can be formatted using a format that applies to different eUICCs 108 and/or manufacturers thereof. The format can be "generic" and not "specific" or "customized" for requirements of a particular eUICC or manufacturer thereof. Thus, for example, the same format can be used to provide an eSIM package to different eUICCs 108, and each eUICC 108 can customize the "generically" formatted eSIM contents locally at the eUICC 108 for installation on the eUICC 108, e.g., by the eSIM manager 210 of the eUICC 108. In step 306, the eSIM manager 210 parses the eSIM contents to retrieve a set of individual eSIM components, which can include files, applications, settings, keys, etc. for an eSIM 208. In some embodiments, the eSIM components of the eSIM 208 include elementary files (EFs) and dedicated files (DFs), such as defined by 3GPP and/or ETSI. In some embodiments, the eSIM components include a set of applications or applets 212 associated with the eSIM 208. In some embodiments, the eSIM components include a set of security domain settings, which can be used to define operation of an eSIM specific security domain in which the eSIM 208 can be stored and/or managed. In some embodiments, the eSIM components include a set of eSIM keys, e.g., for encryption/decryption, and/or network access application (NAA) secrets used for authentication and/or authorization and/or protection of eSIM contents. In step 308, the eSIM manager 210 installs each eSIM component of the eSIM 208 into an eSIM security domain 310 associated with the eSIM 208. In some embodiments, multiple eSIMs 208 can reside in a common eSIM security domain 310, such as for a particular MNO 114. In some embodiments, each eSIM 208 can reside in its own eSIM security domain 310.

Figure 3B:
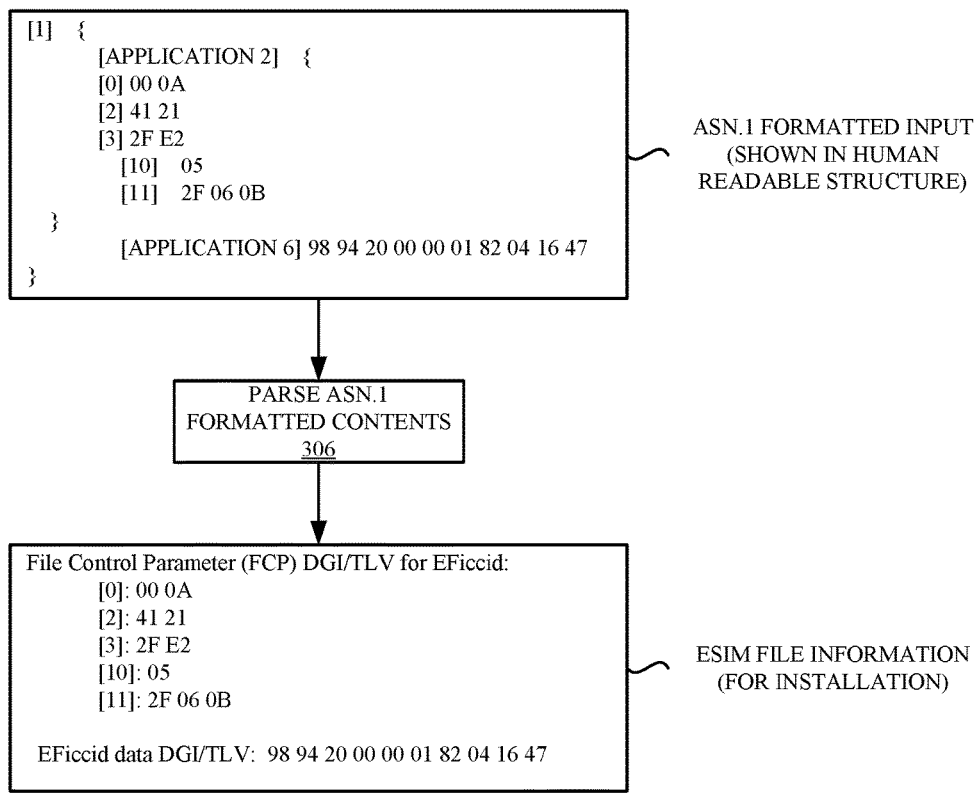
FIG. 3B illustrates a representative parsing of a portion of a standard formatted eSIM package into eSIM content for installation on an eUICC, according to some embodiments.
Figure 4:
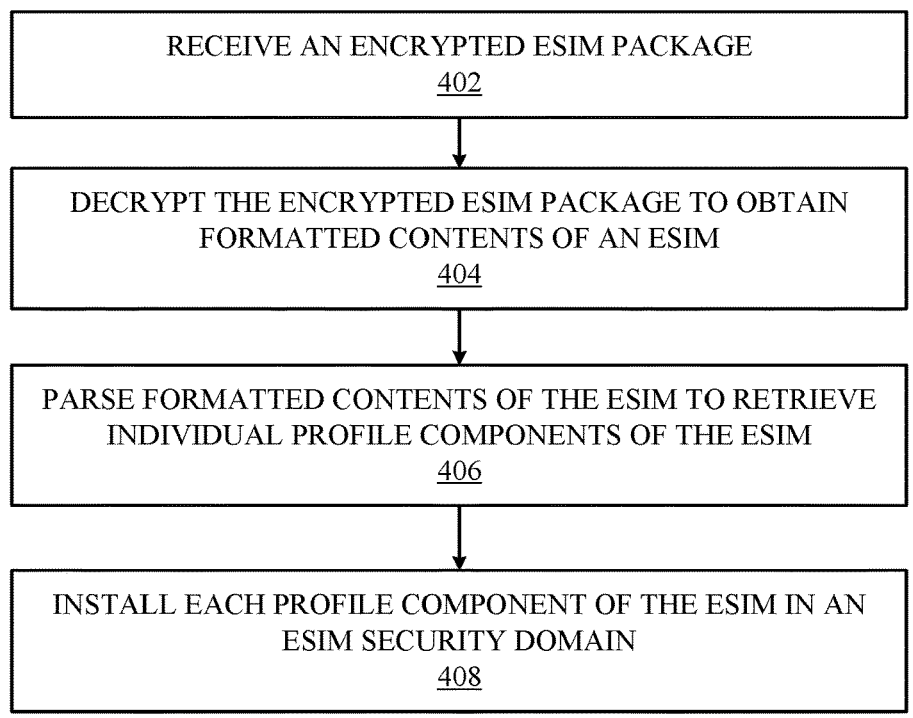
FIG. 4 illustrates a flowchart of an example method for installing an eSIM for storage on the eUICC of the mobile device of FIG. 1, according to some embodiments.

FIG. 3B illustrates a diagram 350 of a representative parsing of a portion of a standardized, formatted eSIM package by the eSIM manager 210 (which is part of the eUICC OS 206) of the eUICC 108. The eSIM package (and/or contents therein) can be formatted in a format that is parsable by any compliant eUICC OS 206 or eSIM manager 210. In some embodiments, the eSIM package (and/or contents therein) is formatted in accordance with an ASN.1 DER encoded format. FIG. 3B illustrates a representative ASN.1 DER encoded portion of contents of an eSIM package, shown in a human readable structure. The eSIM manager 210 can parse the ASN.1 formatted eSIM contents of the eSIM package to produce an eSIM component for eSIM installation on the eUICC 108. In particular, FIG. 3B illustrates an elementary file (EF) for an integrated circuit card identifier (ICCID). After parsing by the eSIM manager 210, the ASN.1 formatted input becomes a set of eSIM contents, namely a file control parameter (FCP) and file data (the ICCID value). The FCP can include a data group identifier (DGI) and a type length value (TLV) for the ICCID EF. The eSIM package parsed by the eSIM manager 210, in some embodiments, can include context information that may or may not be included with an eSIM component. For example, context handling of eSIM contents by the eSIM manager 210 can be standardized. A representative context-handling example includes implicit file path information, such as when a sequence of EFs is created under a common DF path (or folder). Another representative context-handling example includes implicit file record fill patterns to use when creating eSIM contents for installation on the eUICC 108, such as when a fixed-length file record of the eSIM 208 is padded with a particular pattern, e.g., 'FF', to result in a particular length value for the file record (with the 'FF' fill pattern not included in the encrypted, formatted eSIM package to reduce its size). In some embodiments, after parsing, the eSIM manager 210 can "personalize" eSIM contents and/or handle eSIM data for installation on the eUICC 108 in a proprietary manner, e.g., a manner in which keys and/or secrets are used at the eUICC 108 during eSIM installation can be determined by the eSIM manager and not subject to interoperability requirements.

Returning to FIG. 3A, in step 308, the eSIM manager 210 installs components of the eSIM 208 in the eSIM security domain 310 associated with the eSIM 208. The eSIM manager 210 can act as a local (to the mobile device 102) "personalization" sever during installation of the eSIM 208, e.g., to achieve at least in part functionality provided by a provisioning server 140 (or equivalent network based equipment) to manage the eSIM 208 on the eUICC 108 of the mobile device 102. Functions provided by the eSIM manager 210 can be comparable to remote management commands provided by the provisioning server 140 in order to manage the eSIM 208 on the eUICC 108. For example, commands such as "SELECT path", "CREATE file (EF/DF)", "UPDATE record", "LOAD security domain", "INSTALL security domain", "LOAD application", and "INSTALL application" can be realized by the eSIM manager 210 locally on the eUICC 108 of the mobile device 102 to manage the eSIM 208. The eSIM manager 210 can receive the eSIM package, via a secure connection, and the eSIM manager 210 can install the eSIM 208 on the eUICC 108 without requiring receipt of a series of commands from the provisioning server 140 during installation of the eSIM 208. The eSIM manager 210 can decrypt, parse, personalize, process, load, install, verify, and perform other management functions for the eSIM 208 autonomously or with minimal communication with the provisioning server 140. The eSIM manager 210 can notify the provisioning server 140 upon successful installation of the eSIM 208. In some embodiments, the eSIM manager 210 can regenerate a series of commands equivalent to communication between the provisioning server 140 and a "legacy" eUICC OS to realize at least a portion of the process by which the eSIM 208 is installed on the eUICC 108. In some embodiments, the eSIM manager uses a "new" series of commands to achieve the same results as would be achieved by a series of "legacy" commands to install the eSIM 208 on the eUICC 108. In some embodiments, the eUICC 108 stores a set of command scripts that can be executed whole or in part to perform at least a portion of installation of the eSIM 208 on the eUICC 108. In some embodiments, the eUICC performs at least some "personalized" functions in a proprietary manner while installing the eSIM 208 on the eUICC 108. Representative functions can include personalization of one or more keys and/or NAA secrets or other security actions. In addition, file formats for storage of the eSIM 208 on the eUICC 108 can be "personalized" in a proprietary manner, e.g., based on a SIM card specific vendor personalization facility. In some embodiments, the post-installation data structure used to store the eSIM 208 on the eUICC platform can be specific to the eUICC OS; however, data of the eSIM 208 can be viewed and/or managed via a standard interface, such as a terminal to UICC/eUICC interface. Thus, the eSIM 208 can be stored differently for each eSIM 208 but can be presented via standard interfaces in a "uniform" manner. For example, eSIM management by "off-card" entities, such as by a remote management server and/or via a terminal interface, can conform to a common standardized management interface, such as ETSI TS 103.383 and/or TS 103.384. In some embodiments, selection of an eSIM 208 via an interface can behave in accordance with a legacy interface specification for a UICC, such as specified in the international standard ISO/IEC 7816, which is a standard managed jointly by the International Organization for Standardization (ISO) and the International Electrotechnical Commission (IEC).

Figure 5:
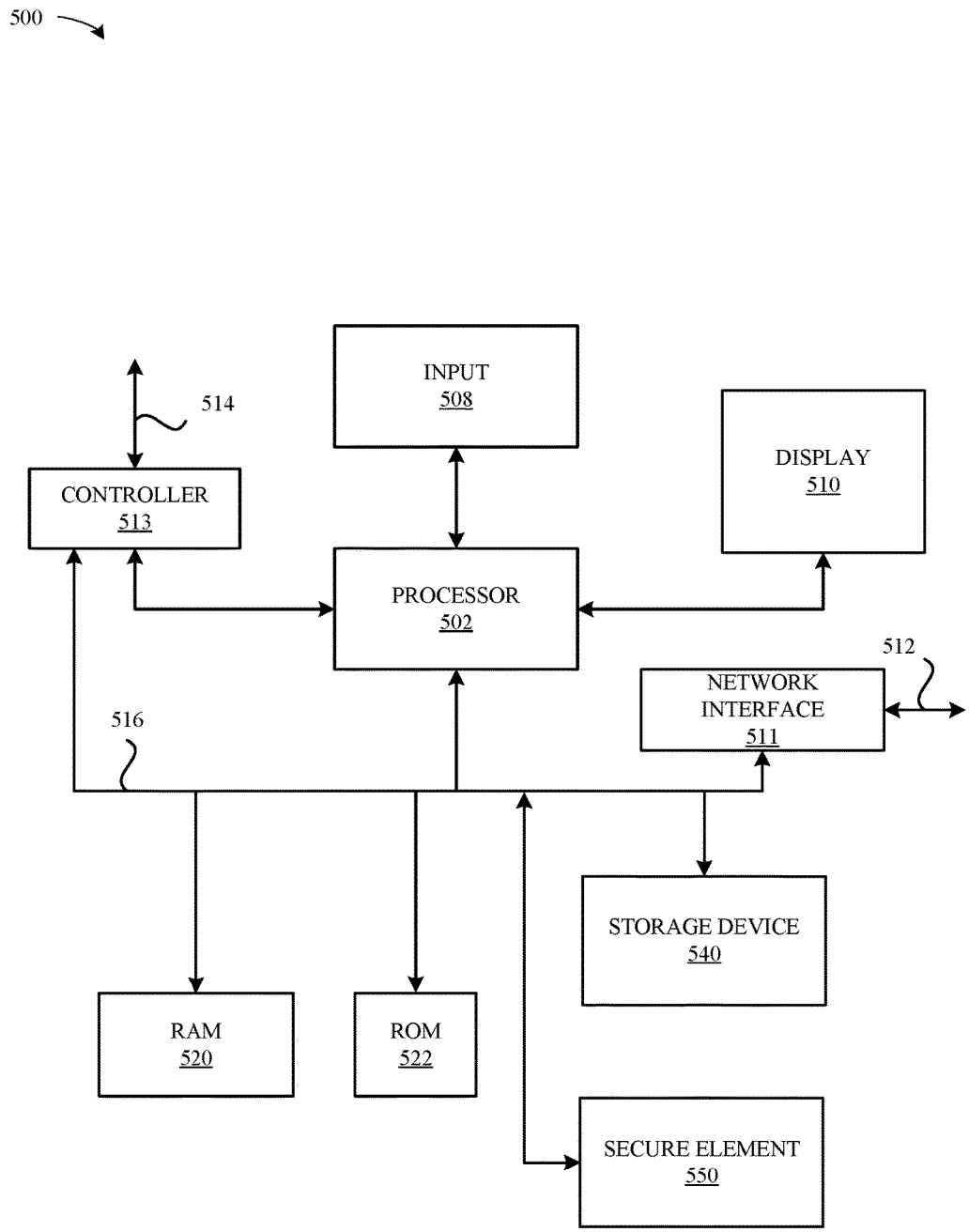
FIG. 5 illustrates a detailed view of an example computing device that can be used to implement various components described herein, according to some embodiments.

FIG. 5 illustrates a detailed view of a computing device 500 that can be used to implement the various components described herein, according to some embodiments. In particular, the detailed view illustrates various components that can be included in the mobile device 102 illustrated in FIG. 1. As shown in FIG. 5, the computing device 500 can include a processor 502 that represents a microprocessor or controller for controlling the overall operation of computing device 500, which in some embodiments can represent the main processor 104 of FIG. 1. The computing device 500 can also include a user input device 508 that allows a user of the computing device 500 to interact with the computing device 500. For example, the user input device 508 can take a variety of forms, such as a button, keypad, dial, touch screen, audio input interface, visual/image capture input interface, input in the form of sensor data, etc. Still further, the computing device 500 can include a display 510 (screen display) that can be controlled by the processor 502 to display information to the user. A data bus 516 can facilitate data transfer between at least a storage device 540, the processor 502, and a controller 513. The controller 513 can be used to interface with and control different equipment through and equipment control bus 514. The computing device 500 can also include a network/bus interface 511 that couples to a data link 512. In the case of a wireless connection, the network/bus interface 511 can include a wireless transceiver.

The computing device 500 also include a storage device 540, which can comprise a single disk or a plurality of disks (e.g., hard drives), and includes a storage management module that manages one or more partitions within the storage device 540. In some embodiments, storage device 540 can include flash memory, semiconductor (solid state) memory or the like. The computing device 500 can also include a Random Access Memory (RAM) 520 and a Read-Only Memory (ROM) 522. The ROM 522 can store programs, utilities or processes to be executed in a non-volatile manner. The RAM 520 can provide volatile data storage, and stores instructions related to the operation of the computing device 500. The computing device 500 can further include a secure element 550, which can represent the eUICC 108 illustrated in FIGS. 1, 2 and 3A and described in detail herein.

The various aspects, embodiments, implementations or features of the described embodiments can be used separately or in any combination. Various aspects of the described embodiments can be implemented by software, by hardware, or by a combination of hardware and software. The described embodiments can also be embodied as computer readable code on a computer readable medium. The computer readable medium is any data storage device that can store data, which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of specific embodiments are presented for purposes of illustration and description. They are not intended to be exhaustive or to limit the described embodiments to the precise forms disclosed. It will be apparent to one of ordinary skill in the art that many modifications and variations are possible in view of the above teachings.

What is claimed is:

1. A method for managing electronic Subscriber Identity Modules (eSIMs) on an embedded Universal Integrated Circuit Card (eUICC) included in a mobile device, the method comprising:
by the eUICC:
receiving, from a provisioning server via a secure connection through a wireless network, an encrypted eSIM package comprising context information or an indication of context information;
decrypting the eSIM package to obtain formatted contents of an eSIM, wherein a format of the contents of the eSIM is not specific to requirements of the eUICC;
parsing the formatted contents of the eSIM to retrieve a set of individual components of the eSIM using the context information to generate at least a portion of the set of individual components of the eSIM; and
installing the set of individual components of the eSIM in an eSIM security domain on a memory of the eUICC,
wherein the context information comprises implicit file path information for organizing a sequence of elementary files (EFs) under a common dedicated file (DF) path.

2. The method of claim 1, wherein contents of the encrypted eSIM package are formatted in accordance with an abstract syntax notation (ASN.1) distinguished encoding rules (DER) format.

3. The method of claim 2, wherein the eSIM installed in the eSIM security domain on the memory of the eUICC is formatted in accordance with the requirements of the eUICC or requirements of the mobile device.

4. The method of claim 1, further comprising:
by the mobile device:
transmitting, to the provisioning server via a second secure connection, an indication of successful installation of the eSIM on the eUICC.

5. The method of claim 1, wherein the eUICC installs the set of individual components of the eSIM in the eSIM security domain on the memory of the eUICC while disconnected from the provisioning server.

6. The method of claim 1, wherein the decrypting, the parsing, and the installing are performed by an eSIM management entity on the eUICC, the eSIM management entity comprising an Issuer Security Domain (ISD) level application.

7. The method of claim 1, wherein the decrypting, the parsing, and the installing are performed by an eSIM management entity on the eUICC, the eSIM management entity comprising an application that includes specific security service capabilities for secure communication.

8. An embedded Universal Integrated Circuit Card (eUICC) configured to manage electronic Subscriber Identity Modules (eSIMs) for a mobile device, the eUICC comprising:
a memory configured to store at least one eSIM; and
an embedded processor configured to carry out steps that include:

receiving, from a provisioning server via a secure connection through a wireless network, an encrypted eSIM package comprising context information or an indication of context information;

decrypting the eSIM package to obtain formatted contents of an eSIM, wherein a format of the contents of the eSIM is not specific to requirements of the eUICC;

parsing the formatted contents of the eSIM to retrieve a set of individual components of the eSIM using the context information to generate at least a portion of the set of individual components of the eSIM; and installing the set of individual components of the eSIM in an eSIM security domain on a memory of the eUICC, wherein the context information comprises implicit file path information for organizing a sequence of elementary files (EFs) under a common dedicated file (DF) path.

9. The eUICC of claim 8, wherein contents of the encrypted eSIM package are formatted in accordance with an abstract syntax notation (ASN.1) distinguished encoding rules (DER) format.

10. The eUICC of claim 9, wherein the eSIM installed in the eSIM security domain on the memory of the eUICC is formatted in accordance with the requirements of the eUICC or requirements of the mobile device.

11. The eUICC of claim 8, wherein the mobile device transmits, to the provisioning server via a second secure connection, an indication of successful installation of the eSIM on the eUICC.

12. The eUICC of claim 8, wherein the eUICC installs the individual components of the eSIM in the eSIM security domain on the memory of the eUICC while disconnected from the provisioning server.

13. The eUICC of claim 8, wherein the decrypting, the parsing, and the installing are performed by an eSIM management entity on the eUICC, the eSIM management entity comprising an Issuer Security Domain (ISD) level application.

14. The eUICC of claim 8, wherein the decrypting, the parsing, and the installing are performed by an eSIM management entity on the eUICC, the eSIM management entity comprising an application that includes specific security service capabilities for secure communication.

15. A mobile device configured to manage electronic Subscriber Identity Modules (eSIMs), the mobile device comprising:

a main processor communicatively coupled to memory;
a baseband component communicatively coupled to at least one antenna; and
an embedded Universal Integrated Circuit Card (eUICC), wherein the eUICC is configured to carry out steps that include:

receiving, from a provisioning server via a secure connection through a wireless network, an encrypted eSIM package comprising context information or an indication or context information;

decrypting the eSIM package to obtain formatted contents of an eSIM, wherein a format of the contents of the eSIM is not specific to requirements of the eUICC;

parsing the formatted contents of the eSIM to retrieve a set of individual components of the eSIM using the context information to generate at least a portion of the set of individual components of the eSIM; and installing the set of individual components of the eSIM in an eSIM security domain on a memory of the eUICC, wherein the context information comprises implicit file path information for organizing a sequence of elementary files (EFs) under a common dedicated file (DF) path.

16. The mobile device of claim 15, wherein contents of the encrypted eSIM package are formatted in accordance with an abstract syntax notation (ASN.1) distinguished encoding rules (DER) format.

17. The mobile device of claim 15, wherein the eSIM installed in the eSIM security domain on the memory of the eUICC is formatted in accordance with the requirements of the eUICC or requirements of the mobile device.

18. The mobile device of claim 15, wherein the eUICC installs the set of individual components of the eSIM in the eSIM security domain on the memory of the eUICC while disconnected from the provisioning server.

19. The mobile device of claim 15, wherein the decrypting, the parsing, and the installing are performed by an eSIM management entity on the eUICC, the eSIM management entity comprising an Issuer Security Domain (ISD) level application.

20. The mobile device of claim 15, wherein the decrypting, the parsing, and the installing are performed by an eSIM management entity on the eUICC, the eSIM management entity comprising an application that includes specific security service capabilities for secure communication.

* * * * *